Figure 1:
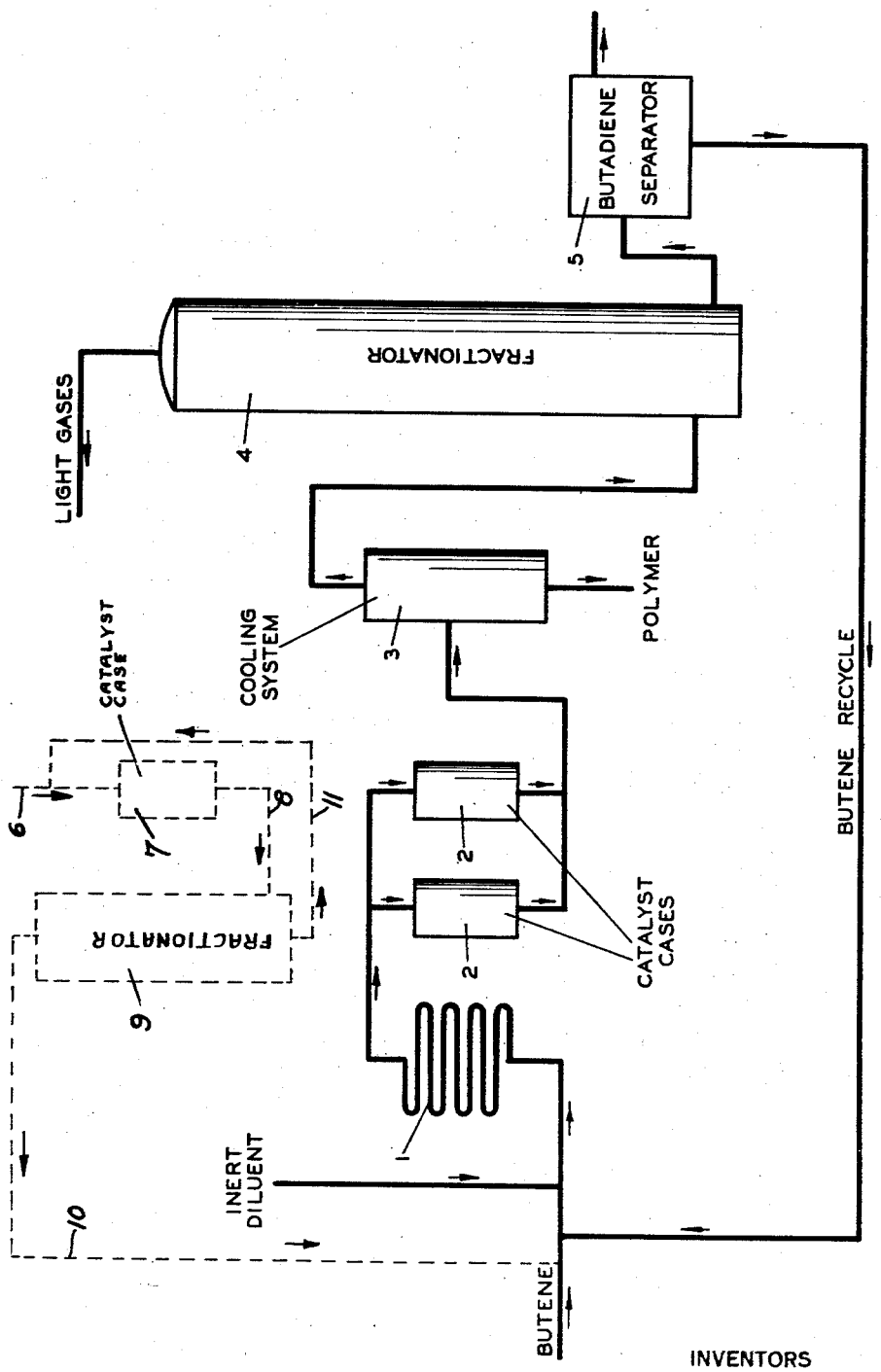

July 31, 1945. W. A. SCHULZE ET AL 2,380,876
PROCESS FOR THE DEHYDROGENATION OF HYDROCARBONS
Filed Aug. 23, 1940 2 Sheets-Sheet 1

INVENTORS
W. A. SCHULZE
J. C. HILLYER
H. E. DRENNAN
BY Hudson, Young, Shanley and Yinger
ATTORNEY Patented July 31, 1945

2,380,876

UNITED STATES PATENT OFFICE 2,380,876

PROCESS FOR THE DEHYDROGENATION OF HYDROCARBONS

Walter A. Schulze, John C. Hillyer, and Harry E. Drennan, Bartlesville, Okla., assignors to Phillips Petroleum Company, a corporation of Delaware Application August 23, 1940, Serial No. 353,961

10 Claims. (Cl. 260—680)

This invention relates to the dehydrogenation of hydrocarbons at elevated temperatures in the presence of catalysts. It relates particularly to the catalytic dehydrogenation of butenes to produce butadiene.

In a more specific sense the invention is concerned with a novel process for controllably increasing the degree of unsaturation in hydrocarbons of the type mentioned by employing especially treated catalysts so that the mono-olefinic hydrocarbons are converted into diolefins with a higher yield of diolefins and a practical minimum of undesirable accompanying reactions.

Heretofore it has been the practice of those attempting to convert mono-olefins to diolefins to employ catalysts chosen from the group which has been found more or less satisfactory for the dehydrogenation of paraffins to form mono-olefins. This practice has apparently been based on the assumption that the conditions and catalyst activities which promote the production of mono-olefins from paraffins will in some measure produce further dehydrogenation of mono-olefins to form diolefins. In some cases, minor yields of diolefins have been obtained, but in general the low yields and the difficulties of control so as to avoid excessive losses due to cracking and polymerization have made the processes unattractive on a commercial scale.

We have found by experimental tests in which equilibrium values have been substantially attained that the concentration of diolefins formed from mono-olefins at a given temperature is extremely small compared to the concentration of mono-olefins formed by the dehydrogenation of paraffins at the same temperature. Thus, for example, in the dehydrogenation of n-butane over a common dehydrogenation catalyst at 1000° F., the equilibrium concentration of butenes is 26 per cent, while under the same conditions the concentration of butadiene formed from butenes is only 1.5 per cent. In this instance the conversion of mono-olefins to diolefin is clearly far below desirable limits for a commercial process.

One possible expedient for increasing the degree of conversion in the dehydrogenation of mono-olefins is to increase the activity of a catalyst by operating at higher temperatures. In this connection it has been noted that the conversion of mono-olefins is markedly increased by operation at temperatures about 200° F. above those required for the dehydrogenation of paraffins using the same catalyst. However, it has likewise been proved that the increased cracking and polymerization losses and the exceedingly rapid poisoning of the catalyst by carbon deposition overbalance the increase in conversion. Thus, while it is desirable to dehydrogenate mono-olefins at higher temperatures, the catalysts usually considered for the dehydrogenation are not satisfactory at said higher temperatures.

Many of the catalysts which have been proposed for promoting dehydrogenation reactions have been unsatisfactory, even in conversion of paraffins, because they tended to be too active, and their use required employing low temperatures and high space velocities to avoid disruption of the hydrocarbon molecule. By activity in this connection, we mean the property of promoting hydrocarbon conversions in general, and do not mean to limit the term to activity in the dehydrogenation reaction alone. For example, a catalyst such as metallic nickel is very active, but its efficient use requires such low temperatures that equilibrium conditions are reached when only a small amount of the treated material has been dehydrogenated. At higher temperatures, such a catalyst is so active in promoting other reactions, particularly those involving the splitting of carbon bonds that the recovery of both the product and the unconverted hydrocarbon is reduced below practical limits. Even in the treatment of paraffin hydrocarbons these active catalysts have been difficult to control in practice, and attempts to use them in dehydrogenating olefins have been unsuccessful because of the higher temperatures necessary.

We have found in operating the dehydrogenation of olefins, particularly of butenes, that cracking reactions often occur to a greater extent than in treating paraffins at the same temperature, even though splitting to form hydrogen and carbon. It has also been found in carrying out the catalytic dehydrogenation of butenes that in addition to the products of splitting containing fewer carbon atoms per molecule, a considerable quantity of polymeric material containing more than four carbon atoms per molecule is also formed. Thus, the yield and the recovery are still further reduced.

Although the entire set of reactions involved is not fully understood, it is believed that it is through the formation of these heavy polymeric products that the increased cracking occurs. The olefins, such as butenes, are quite readily polymerized, and being present in high concentration, form a considerable amount of such polymer. The catalysts used ordinarily promote this polymerization rather actively. The heavier polymers which are formed are then split to a large extent, resulting in deposition of carbon on the catalyst as well as production of light gases. Further, the diolefins, which are formed by dehydrogenation, are very readily polymerizable. Thus, when using a very active catalyst the yield is often reduced by polymerization of the diolefin which is formed. This diolefin polymer is also rather readily split, and contributes still further to the operating difficulties and product losses.

From the foregoing it will be evident that a suitable catalyst for the dehydrogenation of olefins must retain for a reasonable period a high degree of activity at operating temperatures appreciably higher than those considered for other dehydrogenation reactions. Further said catalyst must be quite specific in promoting only the dehydrogenation reaction in order that cracking and polymerization of the hydrocarbons and coking of the catalysts be suppressed. In the absence of any known dehydrogenation catalyst which fulfilled these qualifications we have discovered a means of modifying the activity of a preferred mineral catalyst to suit our purposes.

The natural mineral ore bauxite is a catalyst which has been applied with great success to the dehydrogenation of paraffin hydrocarbons at temperatures in the range of 900 to 1100° F. The dehydrogenation of olefins over a bauxite catalyst at temperatures between 1100 and 1300° F. which were required for satisfactory conversion indicated satisfactory activity in the production of diolefins but operating cycles were extremely short due to rapid poisoning of the catalyst.

We have now discovered a means of improving the olefin-diolefin conversion over bauxite catalyst whereby the dehydrogenating activity of the catalyst is maintained at a desirable level, while the promotion of cracking and polymerization reactions is greatly suppressed. This production of a valuable modified-activity catalyst together with the improved olefin dehydrogenation resulting from its use are the objects of this invention.

We have now found that olefin dehydrogenation may be carried out to give good yields of diolefins by operating at higher temperatures, such as from 1100 to 1300° F. or above when dehydrogenating butenes, if our preferred catalyst be used. Further, we have found that when our preferred catalyst is used, equilibrium dehydrogenation may be achieved throughout the range of practical operating conditions, but, generally, only slightly beyond this range.

We have noted that when the activity of our catalyst is at the desired minimum level at which equilibrium dehydrogenation can still be obtained, that the extent of splitting and polymerizing reactions has been reduced to such an extent that the process can be carried out more economically on a commercial scale. Thus, when operating at temperatures formerly considered as the maximum, greatly increased ultimate yields can be obtained, due to the suppressed decomposition. Or as we usually prefer to do, we may operate at a higher temperature, in which case increased dehydrogenation takes place with a loss which at most is no greater than that formerly sustained at the lower temperature.

We prepare our catalyst from the mineral bauxite by a certain "deactivation" treatment, whereby its activity with regard to splitting and polymerizing reactions is greatly reduced. This modification may readily be accomplished by impregnating the bauxite with a minor proportion, usually from 1 to 10 per cent of barium hydroxide or strontium hydroxide.

A suitable catalyst may be prepared by spraying a solution of barium hydroxide over calcined bauxite as a mist. The bauxite takes up the solution and immediately appears dry. It is ready for use after being dried at elevated temperature in a slow stream of gas. Since barium hydroxide is only slightly soluble in cold water, it is necessary to use a hot solution for the spray. The quantity of barium hydroxide used may be varied at will, generally 1 to 10 per cent being the limits of valuable concentrations. Often five per cent by weight of the bauxite is a satisfactory amount to use. Instead of barium hydroxide we may use a solution of a soluble barium salt which is converted to the hydroxide by subsequent treatment with a solution of hydroxide such as ammonium hydroxide. The other salts formed may then be removed by washing or other suitable means.

The barium or strontium hydroxide solution may be applied to the catalyst by other methods as by soaking the catalyst therein, but we prefer to spray the material if possible. In this way a very definite quantity can be added and uniform distribution may be obtained.

The hydroxides of barium and strontium were selected rather than the oxides, since the latter are water-insoluble and cannot readily be applied to the catalyst by any of the common methods. The oxides may be used, however, if methods of incorporating them uniformly in the catalyst, such as spraying in solution in some other volatile solvent, are used. These hydroxides lose all water of hydration just below the operating temperatures, but are not further dehydrated to the oxide in this range. If calcined at a very high temperature the oxides, which are equally satisfactory, may be formed.

The bauxite used for the catalyst may be selected in accordance with the usual requirements for catalytic processes, hard, rugged, and free of dust. From about 6 mesh to about 20 mesh particles are preferred, allowing reductions in flow rate proportionate to the decreased catalyst surface when using the coarser catalysts. The elimination of iron oxide impurity from the bauxite is important and all separate particles of iron oxide should be removed by one of the well known processes, such as magnetic or gravity separation, prior to barium hydroxide treatment. Carbon formation, probably from heavy polymer, is very serious at localized points wherever a nucleus of iron oxide exists. The carbon formed is very voluminous, and this increase in volume causes considerable development of back pressure.

In one specific embodiment, butadiene is produced from butenes diluted with an inert gas by contacting with bauxite which has been treated with five per cent of barium hydroxide at a temperature of 1200° F. and space velocity of about 1200 volumes per hour, cooling the effluents, separating the light gases, then separating the butadiene from the unreacted butenes and recycling the later for further conversion. If desired, the butadiene may be separated from the effluents prior to removal of the light gases.

The process may be more readily understood by reference to the accompanying drawing Figure 1. This represents schematically one form of apparatus in which the process may be carried out. In the figure 1 is a heater into which the butenes and the diluent gas entering the system are first led and vaporized leaving the heater, the heated vapors enter catalyst chamber 2, where they contact the barium hydroxide-treated bauxite. The vapors then pass through a cooling system 3, wherein any heavy polymers formed may be removed and enter fractionating unit 4, in which the light gases and hydrogen formed in the reaction and diluent gas are separated from the C4 fraction. Leaving the fractionating unit this material passes to butadiene separator 5, in which butadiene is separated from the mixed butenes by suitable means, and is sent to storage. The butenes remaining are ordinarily recycled to heater 1 and pass through the system again and are further converted; or alternately, they may pass directly to storage. The dotted portions of Figure 1 illustrate diagrammatically the catalytic dehydrogenation of butane to produce a mixture of n-butane and butenes and from which a butene-1 rich fraction is obtained which may be used as a feed to the butene dehydrogenation step. A butane feed is introduced through line 6 into catalyst case 7 containing a dehydrogenation catalyst. The effluent which contains n-butane, butene-1 and butenes-2 is introduced through line 8 into fractionator 9, where an overhead fraction comprising butene-1 is withdrawn and introduced through line 10 as feed to the butene dehydrogenation. The bottoms fraction comprising n-butane and butenes-2 may be recycled to the butane dehydrogenation feed through line 11.

In operating our process for the production of butadiene, either of the normal butenes may be used, or any convenient or available mixture of them, with satisfactory results. In many cases, dehydrogenation of the olefin will follow as the second stage to a dehydrogenation step applied to butane. In such cases the butene-1 may be separated by fractionation from the effluent of the first dehydrogenation step and the remaining butene-2 and n-butane recycled to the initial dehydrogenation step. The mixed butenes derived from cracking still gases or other sources are also satisfactory charging stocks.

In operating our process we prefer to use temperature of about 1100 to 1300° F. although the range from 1100 to 1400° F. is suitable in some instances. Space velocities of about 500 or 5000 volumes per hour may be used, and we often prefer to use values within the range of 1000 to 1500 volumes per hour. In one modification of the process we do not employ pressures above atmospheric, at least prior to fractionation. In other modifications of the process, moderate pressures up to about two hundred pounds gage may be used. It is necessary to maintain the partial pressure of butenes at a figure below atmospheric, however, ordinarily below 0.33 atmosphere, and preferably at 0.1 to 0.25 atmosphere. This is most readily accomplished by dilution with an inert gas, although vacuum operation may be used if desired.

Diluent gases which may be used comprise the hydrocarbons more refractory than butenes, particularly methane, ethane, and propane, and other inert gases, especially carbon dioxide, hydrogen, and nitrogen. While hydrogen may be used, the presence of any appreciable amount of it when the partial pressure of butenes is also low, adversely affects the equilibrium in accordance with the mass law.

The steps of cooling and fractionating both the light gases and heavy polymer may be carried out in single step or by means of combinations of polymer separators, partial coolers and one or more fractionating columns. A variety of operations is possible, and economic and other factors will dictate the choice of equipment used. If the diluent gas is separated from the light gases formed in the reaction, it can, of course, be recycled with fresh charge.

The four-carbon fraction resulting from fractionation may be treated by any one of the well-known methods whereby butadiene is extracted and recovered from its mixtures with butenes. The remaining butenes are ordinarily then recycled to the process, but may, of course, be used for other purposes, if desired.

Catalyst chambers may be of various sizes and designs, as will be evident to those skilled in the art. In general, we prefer chambers of considerable area and shallow depth, or a plurality of rather shallow chambers, to avoid considerable pressure drop through the bed at the rather high gas velocities employed.

The catalyst life obtained in the use of our catalyst depends upon the material being treated as well as the severity of treating conditions and may vary between rather wide limits. Under preferred conditions of treatment of butenes a normal life is from four to ten hours before regeneration is required. Regeneration may be accomplished by burning with air, oxygen, or oxygen containing gases. We prefer to control the combustion so that regeneration proceeds slowly over a period comparable to the operating cycles and to maintain the temperature of regeneration between about 1200 and 1400° F. By this process carbon and tarry deposits are burned from the catalyst grains and their original active surface and porosity are restored. The catalyst may be regenerated many times without appreciable deterioration.

The action of barium and strontium hydroxides in our process is distinctly different from the action on bauxite of the alkali metal hydroxides. Thus we have found that the treatment of bauxite with dilute solutions of sodium and potassium hydroxides or with various alkali metal salts does not produce the desired results. Also the treatment of bauxite with alkali metal hydroxides prior to activation by the addition of metallic oxides such as chromium oxide has been described, but such an activation treatment is obviously not the same as the present process and could not produce the results disclosed herein.

Untreated bauxite when used for the dehydrogenation of butenes has a considerable induction period before maximum conversion is obtained and after the maximum is reached the activity declines rapidly due to carbon deposition. The maximum is usually reached in about two hours, and a treating cycle of about 2 to 4 hours is as long as can be operated between regenerations. During the induction period considerable quantities of heavy polymer are formed and a large volume of low density gas is evolved. Treatment of bauxite with up to five per cent of sodium hydroxide causes yields during the induction period to be slightly higher, but the rate of decline of catalyst activity is not greatly different from untreated bauxite and the net yield of butadiene is only slightly increased.

When bauxite treated with barium hydroxide is used, the yield of butadiene over a smilar period of operation is markedly increased. This is due to the fact that the butadiene produced during the induction period is much nearer the maximum and the decline in activity with time is much slower than for either untreated or for sodium hydroxide-treated bauxite. Also the barium hydroxide treatment increases the length of the permissible period as much as 25 to 100 per cent over that obtained with untreated or sodium hydroxide-treated bauxite.

Figure 2:
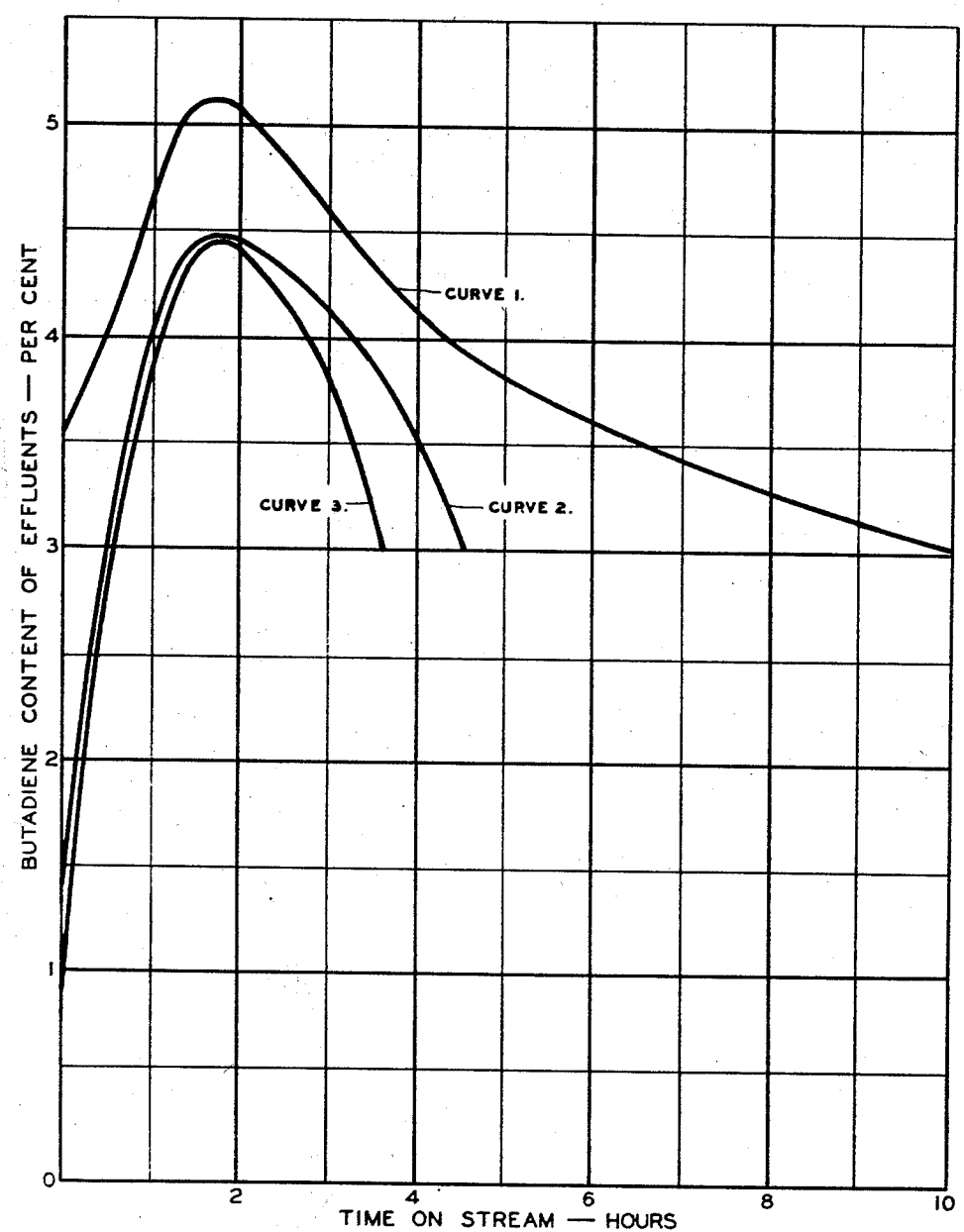

These improved results obtainable with our new catalyst may be more readily understood from the accompanying drawings, Figure 2, which shows in graphical form the results obtained when using our catalyst for the desired dehydrogenation. In the figure, the curve marked 1, represents the concentrations of butadiene obtained in the effluents when dehydrogenating a mixture of one volume of butene and three volumes of nitrogen over barium hydroxide-treated bauxite at 1175° F. The results obtained when untreated bauxite was employed as a catalyst under exactly the same conditions are shown by the curve 3. The much increased yield of butadiene during the initial period, the higher maximum value and the much slower rate of decline when using the treated catalyst are evident.

The increased operating cycle possible when using the barium hydroxide-treated catalyst may also be noted. A concentration of three per cent butadiene in the effluent gas is taken as the minimum value at which butadiene can be economically removed from the effluent stream and this minimum denotes the end of a dehydrogenation cycle. Curve 3 shows that when using untreated catalyst the concentration had decreased to this value in about three and one half hours. When using barium hydroxide catalyst, as shown by curve 1, the concentration was still above this figure after ten hours operation, and in some cases the cycle can be extended to 12 hours or more.

From the figure it may be determined that in a unit processing one thousand cubic feet of butene-1 per hour, the use of barium hydroxide-treated catalyst under these conditions would yield 1625 cubic feet of butadiene per cycle, while the use of untreated catalyst would yield only 560 cubic feet of butadiene per cycle.

In Figure 2, curve 2 represents results of a similar test using regenerated sodium hydroxide-treated bauxite. The slightly slower decline in activity extended the cycle to four and one half hours; butadiene produced in a one thousand cubic feet unit using this catalyst would amount to only about 675 cubic feet per cycle.

With barium hydroxide-treated bauxite catalyst, increased temperatures of operation are possible with resultant higher yields of butadiene. Material balances show an increased recovery of $C_4$ hydrocarbons as compared to dehydrogenation over untreated bauxite, and the yield of butadiene is increased by the more favorable equilibrium and the fact that the effects of the barium hydroxide treatment persist unchanged at the higher temperature levels.

Bauxite treated with sodium or potassium hydroxide is not resistant to high temperature treatment. Thus any effect due to these hydroxides is quickly lost by heating to 1000° F. or higher. If in the dehydrogenation of butenes the temperature is quickly raised to 1100° F. and the flow of butene is started immediately the small improvement cited above is obtained. However, if the catalyst is held at 1100° F. for even one hour before the hydrocarbon flow is started even this effect is substantially lost. The effect of regeneration is likewise entirely different for bauxite treated with sodium or potassium hydroxide, since such material is of course returned to the state of original activity of untreated bauxite by the high temperatures of regeneration. On the other hand bauxite treated with barium or strontium hydroxide is unaffected by regeneration, and results obtained with regenerated catalyst duplicate those obtained before regeneration. Since operation with repeatedly regenerated catalysts is the only practical method, the superiority of bauxite treated with barium hydroxide after regeneration is a very important factor.

The exact mechanism by which barium and strontium hydroxides alter the catalytic properties of bauxite is not fully understood, nor is such understanding necessary to successful operation of our process. It is possible to explain the action of these compounds on bauxite by assuming that certain acidic components of the bauxite such as silica and silicates and the like capable of promoting cracking and polymerization are thereby neutralized and rendered inactive. It is certain that deposition of these compounds on the surface of the bauxite does not greatly deactivate it for dehydrogenation or prevent achieving substantially equilibrium values under previously mentioned dehydrogenation conditions. At temperatures of 1000° F. or above, the alkali metal hydroxides are molten and are known to react readily with alumina. Thus, reaction of sodium or potassium oxide with the alumina in bauxite to form the neutral aluminate would explain the loss of the deactivating effect of said hydroxides at high temperatures. Barium and strontium hydroxides, on the other hand, remain solid and undissociated up to much higher temperatures. Such hydroxides probably remain in place without reacting with alumina and so lose none of their deactivating effect.

The following examples will serve to more fully illustrate the results which may be obtained by our invention. However, since the number of examples could be multiplied greatly, the ones given here are merely illustrative, and are not to be construed as limiting the invention.

*Example I*

A catalyst was prepared by impregnating 6–14 mesh calcined bauxite with five per cent by weight of barium hydroxide by spraying on a hot solution. The catalyst was dried at a high temperature and then used for dehydrogenation of butene-1. Butene-1 was diluted with nitrogen gas to result in a partial pressure of 0.25 atmosphere and passed over the catalyst maintained at 1125° F. at a space velocity of 1400 volumes per hour at atmospheric pressure. Analysis of the effluent vapors showed an initial conversion to butadiene of 13 per cent of the butene-1 charged, which increased to 16.3 per cent and slowly declined to about 12 per cent after six hours operation. The catalyst was then regenerated by burning off the deposited carbon slowly with air. Following this treatment, butene-1 diluted with nitrogen was again passed over the catalyst using the same conditions as before. The results obtained in the second six hours operating period were almost identical with those in the first cycle. Untreated bauxite was used under the same operating conditions; it gave results showing an initial conversion to butadiene of only about three per cent. This increased to the maximum value of 16 per cent after about two hours running, and then rapidly declined. After six hours running conversion to butadiene was only seven per cent. After regeneration a second test gave identical results.

*Example II*

The catalyst containing five per cent barium hydroxide used in Example I was again regenerated and used for a test conducted at 1175° F. The same mixture of butene-1 and nitrogen of Example I was used at this increased temperature. The space velocity was reduced to 1275 volumes per hour to maintain the time of contact with the catalyst at the same figure, 0.5 second. Conversion of butene-1 to butadiene increased from an initial value of 13 per cent to a maximum of 21 per cent. After six hours operation, conversion was still about 15 per cent.

Untreated bauxite, regenerated from a previous test, was used under these identical conditions. Conversion of butene-1 to butadiene was initially about six per cent. Conversion to butadiene increased rapidly, but the maximum value, which was reached in less than two hours was only nineteen per cent. A rapid decline then occurred and after four hours operation only 11.5 per cent conversion was found. At this point excessive carbon formation plugged the tube and caused termination of the test.

Example III

A catalyst was prepared from 6-14 mesh calcined bauxite by impregnating with three per cent by weight of sodium hydroxide solution as a spray. The catalyst was warmed in a stream of dry gas, thereby dehydrating it. When the temperature reached 1175° F., butene-1 diluted with nitrogen to a partial pressure of 0.25 atmosphere was passed over the catalyst at 1275 volumes per hour. Analyses indicated that the initial conversion was about twelve per cent of the butene charge. This increased rapidly to about 21 per cent and then decreased to about 9 per cent after six hours operation.

The catalyst was regenerated by burning off the carbon deposit with a slow current of air. Butene-1 was then again treated under identical conditions. An initial conversion of about six per cent, increasing to 19.3 and then decreasing to about 9 per cent was found. Thus, the improved activity of the unregenerated catalyst had been lost on regeneration.

Example IV

A catalyst was prepared by impregnating 6-14 mesh iron-free calcined bauxite with five per cent by weight of strontium hydroxide by spraying on a hot solution. The catalyst was dried at a high temperature and then used for dehydrogenation of butene-1. Butene-1 was diluted with nitrogen gas to result in a partial pressure of 0.25 atmosphere and passed over the catalyst maintained at 1175° F. at a space velocity of 1275 volumes per hour at atmospheric pressure. Analysis of the effluent vapors showed an initial conversion to butadiene of 12.5 per cent of the butene-1 charged, which increased to 21 per cent and slowly declined to 15 per cent at the end of six hours. The catalyst was regenerated by burning off the carbon deposit with a slow current of air. Butene-1 was then again treated under the same conditions with identical results.

While the foregoing disclosure has dealt specifically with the conditions and operations accompanying the conversion of butenes to butadiene, we have noted that our process with certain obvious and necessary modifications may be applied to the dehydrogenation of higher olefins such as pentenes and hexenes to produce corresponding diolefins.

We have now particularly described our invention and illustrated by numerous examples how it may be carried out in practice. The invention is not limited to the examples described nor by any other descriptions given but only by the scope of the appended claims.

We claim:

1. A process for the dehydrogenation of butenes to produce butadiene which comprises passing said butenes over a catalyst consisting essentially of bauxite impregnated with one to ten per cent by weight of barium hydroxide at temperatures within the range of about 1100 to 1300° F., pressures between 0.1 and 2 atmospheres and with space velocities between about 1000 and 2500 volumes (N. T. P.) per hour, treating the effluents to remove the butadiene, and recycling the unconverted butenes to the catalyst.

2. A catalyst for the dehydrogenation of olefins to diolefins which consists of bauxite ore impregnated with a hydroxide of a metal chosen from the group consisting of barium and strontium, said catalyst consisting essentially of a major proportion of bauxite and a minor proportion of said metal hydroxide.

3. In a process for the production of butadiene from n-butane by steps which include the initial catalytic dehydrogenation of n-butane to produce a mixture comprising n-butenes and n-butane, treating said mixture to produce an n-butene fraction and an n-butane fraction and continuously recycling said n-butane fraction to the initial dehydrogenation step, the step of treating the n-butene fraction under dehydrogenating conditions over a catalyst consisting essentially of bauxite impregnated with about one to ten per cent by weight of barium hydroxide, to convert a substantial proportion of said n-butene to butadiene.

4. A process for the dehydrogenation of olefins to produce diolefins which comprises contacting said olefins at dehydrogenating temperatures with a catalyst consisting essentially of bauxite impregnated with a barium composed subsequently converted to the hydroxide, said catalyst containing a major proportion of bauxite and a minor proportion of barium hydroxide.

5. A process for the dehydrogenation of olefins to produce diolefins which comprises contacting said olefins at dehydrogenating temperatures with a catalyst consisting essentially of bauxite impregnated with one to ten per cent by weight of the hydroxide of a metal selected from the group consisting of barium and strontium.

6. A process for the dehydrogenation of olefins to produce diolefins which comprises contacting said olefins at dehydrogenating temperatures with a catalyst consisting essentially of bauxite impregnated with one to ten per cent by weight of the oxide of a metal selected from the group consisting of barium and strontium.

7. A process for the production of butadiene from butenes which comprises contacting butenes diluted with sufficient substantially inert gas to produce a partial pressure of the butenes below atmospheric with a catalyst consisting essentially of a major proportion of bauxite and a minor proportion of barium hydroxide under dehydrogenating conditions of temperature and pressure, treating the effluents from the dehydrogenation step to remove butadiene, and recycling the unconverted butenes to the catalyst.

8. A process for the production of butadiene from butenes which comprises contacting butenes with a catalyst consisting essentially of a major proportion of bauxite and a minor proportion of strontium hydroxide under dehydrogenating conditions of temperature and pressure so that dehydrogenation of butenes to butadiene is the principal reaction occurring, treating the effluents from the dehydrogenation step to remove butadiene, and recycling the unconverted butenes to the catalyst.

9. A process for the dehydrogenation of olefins to produce diolefins which comprises contacting said olefins at dehydrogenating temperatures and pressures with a catalyst consisting essentially of bauxite and a minor proportion of a compound selected from the oxides and hydroxides of barium and strontium.

10. A catalyst for the dehydrogenation of olefins to diolefins which consists essentially of bauxite and a minor proportion of a compound selected from the oxides and hydroxides of barium and strontium.

WALTER A. SCHULZE.
JOHN C. HILLYER.
HARRY E. DRENNAN.